United States Patent [19]

Gale et al.

[11] 4,125,926
[45] Nov. 21, 1978

[54] METHOD OF MAKING ALUMINUM PISTON WITH REINFORCED PISTON RING GROOVE

[75] Inventors: Preston L. Gale, East Peoria; Jack E. Fair, Washington, both of Ill.

[73] Assignee: Caterpillar Tractor Co., Peoria, Ill.

[21] Appl. No.: 781,264

[22] Filed: Mar. 25, 1977

Related U.S. Application Data

[62] Division of Ser. No. 609,264, Sep. 2, 1975, Pat. No. 4,074,616.

[51] Int. Cl.$^2$ .................. B23P 15/10; B23P 9/00; F16J 1/02
[52] U.S. Cl. .................. 29/156.5 R; 219/121 LM; 427/53
[58] Field of Search ........... 29/156.5 R; 219/121 LM, 219/121 L; 427/53

[56] References Cited

U.S. PATENT DOCUMENTS

| | | | |
|---|---|---|---|
| 3,295,198 | 1/1967 | Coan | 29/156.5 R |
| 3,310,423 | 3/1967 | Ingham, Jr. | 219/121 LM |
| 3,562,009 | 2/1971 | Cranston et al. | 427/53 |
| 3,952,180 | 4/1976 | Gnanamuthu | 219/121 LM |
| 4,015,100 | 3/1977 | Gnanamuthu et al. | 219/121 LM |
| 4,048,459 | 9/1977 | Earle | 219/121 LM |

FOREIGN PATENT DOCUMENTS

2,509,190  9/1975  Fed. Rep. of Germany ............. 427/53

OTHER PUBLICATIONS

"Laser Right on the Beam for Heat Treating Duty", from *Iron Age*, Feb. 10, 1975, pp. 45–47.
"Tools and Engineering Materials with Hard, Wear-Resistant Infusions", by Alfred Schmidt, from *Journal of Engineering for Industry*, Aug. 1969, pp. 549–552.

*Primary Examiner*—C.W. Lanham
*Assistant Examiner*—Daniel C. Crane
*Attorney, Agent, or Firm*—Robert W. Dilts

[57] ABSTRACT

An aluminum piston for use in heavy duty internal combustion engines is disclosed, in which the grooves for receiving the piston rings are formed in stainless steel inserts fusion bonded directly to the aluminum without an intermediate metallic layer other than the resulting alloy of the steel and aluminum. The method of making such piston is described in which austenitic stainless steel powder deposited in an oversize groove in the aluminum piston is melted in situ by a laser beam to simultaneously form the stainless steel insert and alloy it with the aluminum to provide a fusion bond, the piston ring groove being subsequently formed in the stainless steel insert.

5 Claims, 4 Drawing Figures

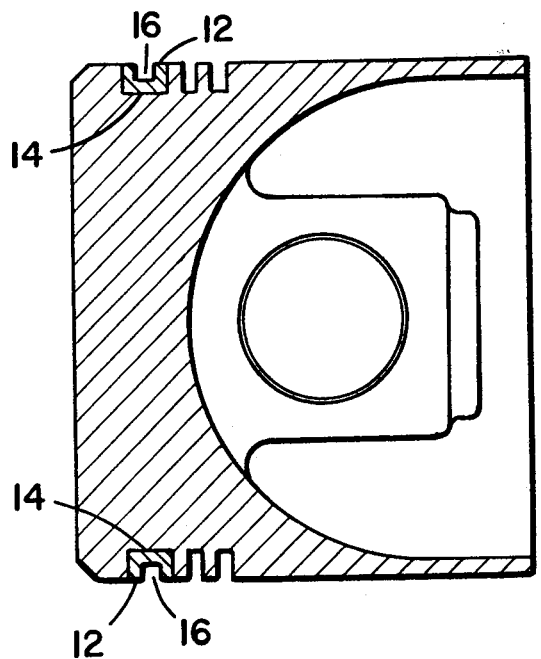
FIG_1
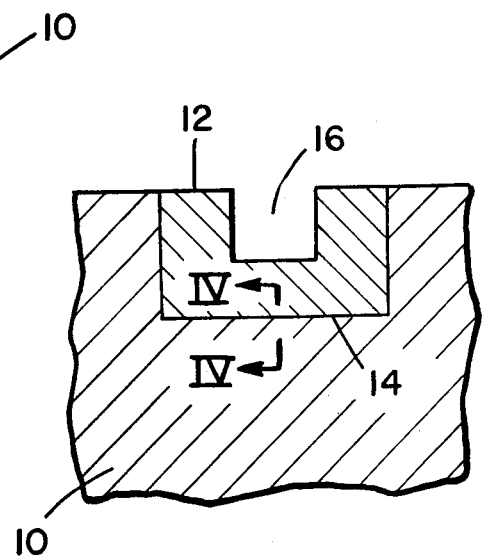
FIG_3
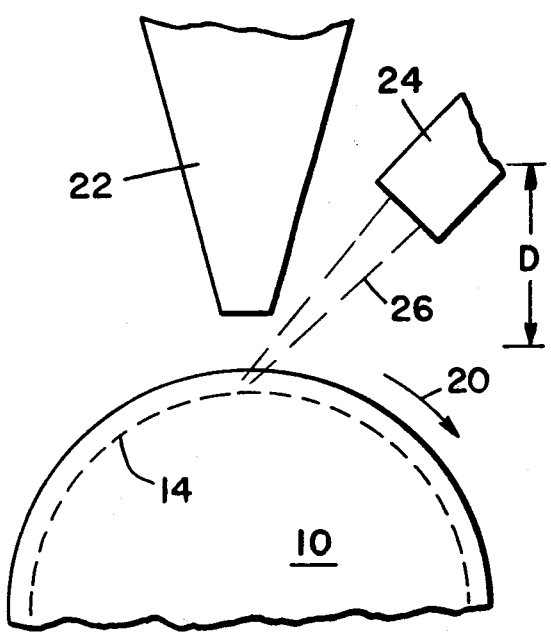
FIG_2
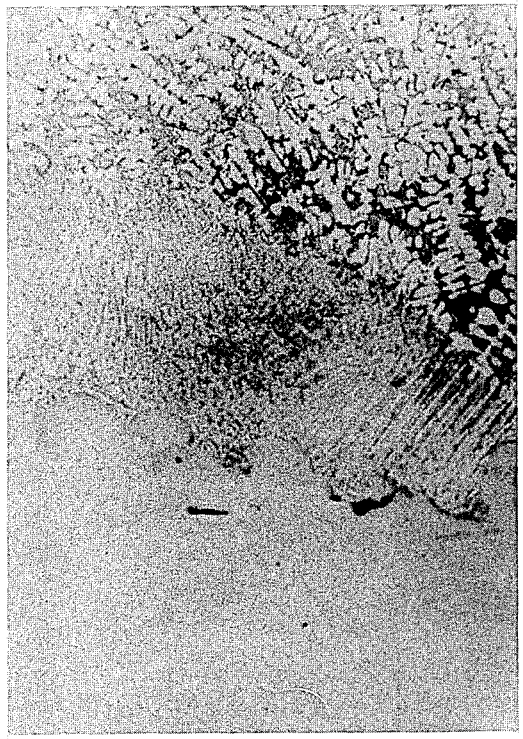
FIG_4

4,125,926

METHOD OF MAKING ALUMINUM PISTON WITH REINFORCED PISTON RING GROOVE

This is a division of Ser. No. 609,264, filed Sept. 2, 1975, now U.S. Pat. No. 4,074,616.

BACKGROUND OF THE INVENTION

This invention relates to heavy duty aluminum pistons, for use in internal combustion engines such as diesel engines, which pistons have reinforced piston ring grooves and particularly to such an aluminum piston and method of making it with a piston ring groove formed in a stainless steel insert therein.

The advantages of using aluminum pistons in internal combustion engines with high compression ratios is well known. However, aluminum pistons have the disadvantage that the walls of piston ring grooves formed therein will deform in use under heavy repetitive impact of the piston rings, which are preferably made of a metal harder than aluminum, thereby shortening the life of the piston and requiring frequent engine overhauling including early replacement of the pistons.

It has been proposed in the prior art to reinforce the piston ring grooves of aluminum pistons with coatings or inserts of a material harder than aluminum such as cast iron or steel. However, since such harder materials melt at temperatures higher than the melting temperature of aluminum, it has been impossible to provide a direct bond between such harder materials and the aluminum piston. If the coatings or inserts are not firmly fixed to the aluminum of the piston, they will tend to move under the influence of the piston rings in use and will eventually produce the same wearing of the aluminum piston as that produced by the piston rings themselves.

Thus, in the prior art, various attempts have been made to mechanically fix steel reinforcing inserts in aluminum pistons. For example, U.S. Pat. No. 3,118,712 to Daub teaches the mechanical embedding of steel inserts in aluminum pistons. Such mechanical bonds are, of course, inherently subject to wear in use.

According to another approach, cast iron rings have been dipped in molten aluminum and placed in the molds for subsequent casting of aluminum pistons thereabout as taught, for example, in U.S. Pat. No. 3,183,796 to Christen et al. However, the resulting bond between the insert and the piston is still essentially a mechanical bond since no alloying of the aluminum with the iron insert can occur at the comparatively low melting temperature of aluminum.

More recently, it has been proposed to flame spray a reinforcing metal such as steel into a preformed groove in the aluminum piston. However, the resulting bond between the piston and the sprayed metal is weak and essentially mechanical. According to the teaching of U.S. Pat. No. 3,715,790 to Reinberger, the bond is improved by first preheating the piston and then spraying a bonding layer of an alloy such as nickel aluminide in the preformed groove prior to filling the groove with a stainless steel spray coating. Even in this case, no alloying of the aluminum with the stainless steel occurs although it may be possible to obtain some fusion of the bonding layer to the aluminum and the stainless steel, respectively, which fusion is sharply limited by the necessity for keeping the temperature of the piston below 800° F. (425° C.) which is the creep point of aluminum.

It is the principal object of this invention to provide an aluminum piston and method of making it with a piston ring groove in a stainless steel insert formed in situ in an oversize groove in the piston and fusion bonded thereto by alloying of the steel and aluminum.

SUMMARY OF THE INVENTION

Briefly, a piston made according to this invention comprises a body of aluminum or aluminum alloy having a cylindrical outer surface and a unitary insert ring of material harder than the body embedded therein with the material of the ring alloyed with the aluminum of the body to provide a diffusion zone at the interface therebetween, the piston ring groove being formed in the insert ring. According to this invention, the piston is made by providing the body with an oversize peripheral piston ring groove and mounting the body for rotation about its cylindrical axis. A powder of metal harder than the aluminum or aluminum alloy is continuously introduced into the oversize groove at a selected point as the body is rotated and a beam of coherent electromagnetic energy focused to a diameter smaller than the width of the oversize groove is impinged on the metal powder in the groove immediately after its introduction therein. The power density of the beam is such that all of the metal powder at the area impinged by the beam is heated to its melting point and subsequently solidifies after impingement by the beam. The process is continued until a unitary insert ring of melted and subsequently solidified metal powder substantially filling the oversize groove is formed in situ in the groove with a diffusion zone of an alloy thereof with the aluminum or aluminum alloy at the interface between the unitary insert ring and the piston body. A piston ring groove is then formed in the unitary insert ring.

BRIEF DESCRIPTION OF THE DRAWING

The foregoing and other objects and features of the subject invention will be more fully understood from a reading of the following detailed description of the drawing wherein:

FIG. 1 is a cross-sectional view of one embodiment of an aluminum piston with a reinforced piston ring groove made in accordance with the teaching of this invention.

FIG. 2 is a fragmentary end view of an aluminum piston mounted for rotation about its cylindrical axis and including a fragmentary showing of a means for introducing metal powder into a peripheral groove in the piston as well as a schematic representation of a laser beam for impinging the metal powder introduced into such groove.

FIG. 3 is an enlarged fragmentary cross-sectional view showing the reinforced piston ring groove of the piston of FIG. 1.

FIG. 4 is a photomicrograph of a polished and etched portion of a piston made in accordance with the teaching of this invention showing the diffusion zone at the interface between the insert ring and the aluminum piston at a magnification of approximately 50 times its true size.

DETAILED DESCRIPTION OF PREFERRED EMBODIMENTS

Referring to FIG. 1, an aluminum piston having a stainless steel insert ring 12 formed in situ in an oversize groove 14 in the periphery of the piston 10 is shown. A single piston ring groove 16 is shown in the insert ring 12.

As shown in FIG. 3, the oversize groove 14 may have a simple rectangular shape although other specific cross-sectional configurations could be used as desired. Similarly, as shown in FIG. 3, the piston ring groove 16 has a simple rectangular shape in cross-section although different cross-sectional configurations could be utilized, as desired. However, it has been found that the oversize groove 14 should have a configuration and dimensions relative to the piston ring groove 16 sufficient to provide an insert ring 12 having a minimum thickness of about 0.050 inch (0.13 cm) between all surfaces of the groove 16 and the groove 14.

Referring to FIG. 2, the method of forming the stainless steel insert ring 12 in situ in the groove 14 according to the teaching of this invention is shown schematically. Thus the piston 10 is shown in fragmentary end view as mounted for rotation about its cylindrical axis as indicated by the arrow 20. The oversize groove 14 is indicated by the dotted lines and according to this embodiment of the invention, the cylindrical axis of the piston 10 is positioned horizontally. A simple funnel member 22 is shown mounted vertically above the cylindrical axis of the piston 10 and directly over the groove 14. A supply of powdered stainless steel metal is introduced into the funnel member 22 and flows therethrough into the groove 14.

A laser 24 is indicated schematically in FIG. 2 as mounted with respect to the piston 10 for the impingement of the beam 26 of coherent electromagnetic energy (shown by dashed lines) produced thereby on the stainless steel powder within the groove 14. As shown in FIG. 2, the laser beam 26 is impinged on the metal powder immediately after its introduction into the groove 14 from the funnel 22. According to this invention, the laser beam 26 is focused to a spot size smaller than the width of the oversize groove 14 and has an energy density of at least 20 KW/in$^2$ (3 KW/cm$^2$).

The laser 24 is positioned with respect to the piston 10 and the groove 14, and the beam 26 thereof is directed in such a way, that the beam impinges only on the metal powder in the groove 14 and not directly on any part of the piston 10. The effect of the impingement of the laser beam 26 on the metal powder is to produce the extremely rapid heating of the metal powder to its melting temperature, which melting temperature is substantially higher than the melting temperature of the aluminum or aluminum alloy of which the piston 10 is made. Heat from the melted metal powder will be conducted to the inner surfaces of the oversize groove 14 resulting in localized melting of the aluminum or aluminum alloy of the piston 10 and an alloying of the metal powder therewith to produce a fusion bond at the interface between the melted metal powder and the aluminum or aluminum alloy of the piston 10.

The speed of rotation of the piston 10 in the direction indicated by the arrow 20 will, of course, determine the length of time of impingement of the beam 26 on each incremental portion of the metal powder within the groove 14. As soon as the piston 10 has been rotated sufficiently so that the beam 26 no longer impinges upon a given incremental portion of such metal powder, it will begin to solidify and cool due to radiation of heat and the conduction of heat by the piston 10. The rate of rotation of the piston 10 and the design of the funnel member 22 will, of course, also determine the quantity of metal powder present in the groove 14 for impingement by the laser beam 26. Thus, the speed of rotation of the piston 10, the amount of metal powder introduced into the groove 14 from the funnel member 22 and the energy level of the laser beam 26 may be adjusted to provide melting of the metal powder present in the groove 14 and the desired alloying of such melted metal powder with the aluminum or aluminum alloy of the piston 10 at the interface therebetween.

Referring to FIG. 4, a photomicrograph of the interface between the insert ring 12 formed in situ in the oversize groove 14 and the aluminum or aluminum alloy of the piston 10 is shown. The lines IV—IV in FIG. 3 indicate the general location at which the photomicrograph of FIG. 4 was taken and thus the bottom part of the photomicrograph shows the aluminum or aluminum alloy of the body of the piston while the upper portion of the photomicrograph of FIG. 4 shows an austenitic stainless steel powder that was melted in situ within the groove 14 in accordance with one embodiment of this invention. The photomicrograph of FIG. 4 is a 50 times enlargement of a sample section cut from a piston 10 made in accordance with one embodiment of the teaching of this invention which sample was treated with a 0.5% solution of hydrofluoric acid in order to enhance the showing of the grain structure of the metals. The diffusion zone between the piston body at the bottom of the photomicrograph and the insert ring at the top of the photomicrograph is clearly shown extending across the center of the photomicrograph. Such diffusion zone is produced by the alloying of the aluminum or aluminum alloy of the piston body with the molten powdered metal during the fusion process in which the insert ring is formed by the impingement of the laser beam. According to this invention such diffusion zone should be at least about 0.009 inch (0.023 cm) thick and has been found to provide a fusion bond having a strength superior to that provided by any teaching of the prior art.

According to this invention, the heating of the aluminum or aluminum alloy of the piston 10 is extremely localized so that the average temperature of the piston body at all times remains well below 800° F. (425° C.). A temperature gradient will, of course, exist across a small volume of the piston 10 immediately adjacent the groove 14. However, the excellent heat conducting properties of aluminum and the comparatively large volume of the piston 10 will enable a satisfactory fusion bond to be formed with a minimum volume of the body of the piston 10 being heated above 800° F. through the proper selection of the power density of the laser beam 26, speed of rotation of the piston 10 and quantity of powdered metal introduced into the groove 14.

The following examples set forth details of the best mode for carrying out specific embodiments of this invention as actually reduced to practice.

EXAMPLE I

A cast or forged aluminum piston blank having a peripheral groove about ¼ inch (0.65 cm) in depth and ⅜ inch (1 cm) in width formed therein is mounted for rotation about its cylindrical axis. The aluminum of the piston blank may be of the following composition:
Copper—3.5–4.5%
Iron—1% max.
Manganese—0.35% max
Magnesium—1.2–1.8%
Zinc— 0.35% max.
Chromium— 0.25% max.

Titanium— 0.25% max.
Nickel—1.7–2.3%
Other elements (each)— 0.05% max.
Other elements (total)— 0.15% max.
Aluminum—remainder.

The piston blank is cleaned with a solvent to remove all grease and debris and a powder of austenitic stainless steel having a particle size of less than 60 mesh is introduced into the groove in the piston blank. The stainless steel of the powder may be of the alloy designated AISI type 304 having the following typical composition:

Chromium:— 18–20%
Nickel:— 8–10.5%
Carbon:— 0.08%
Manganese:— 2%
Silicon:— 1%
Phosphorus:— 0.045%
Sulfur:— 0.030%
Iron:— remainder.

The piston blank is rotated to provide a surface velocity of between 30 and 50 inches per minute (75–125 cm per minute). The austenitic stainless steel powder is introduced into the groove at a point vertically above the horizontal axis of the piston blank is sufficient quantity to substantially fill the groove.

A $CO_2$ laser producing a coherent beam of electromagnetic energy having a wavelength of 10.6 μm at a power level of 10–12 KW is positioned to enable the beam thereof to be directed into the groove in the piston blank immediately after the introduction of the stainless steel powder. The beam is focused to a diameter slightly smaller than the width of the groove at the surface of the piston blank so that it impinges only on the metal powder in the groove and the full 10–12 KW power level of the laser is used to provide a power density of about 20 KW/in$^2$ (3 KW/cm$^2$) in order to melt the powder in the groove. The impingement area of the beam is flooded with the helium gas to shield the melted steel powder and aluminum interface from oxygen and other reactive gases.

After one complete rotation of the piston blank the impingement of the laser beam is interrupted and a unitary ring of austenitic stainless steel is formed in situ within the groove in the piston blank. A fusion type bond is also formed between the unitary ring and aluminum piston by a diffusion zone comprising an alloy of the aluminum with the stainless steel at the interface therebetween having a thickness of at least about 0.009 inch (0.02 cm).

One or more peripheral piston ring grooves are then formed in the unitary insert ring by a milling or other suitable conventional method. The positioning and dimensions of the piston ring grooves in the unitary insert ring are selected so that the insert ring has a minimum wall thickness of about 0.1 inch (0.25 cm) about each piston ring groove.

EXAMPLE II

A piston blank of the same configuration and composition as that of Example I and an austenitic stainless steel powder of the same composition and particle size as that of Example I are used. The piston blank is cleaned, mounted and rotated in the same manner as in Example I and the laser is positioned for impingement of the beam thereof in the same way as in Example I.

However, the rate of introduction of the stainless steel powder is reduced so that the groove in the piston blank is only partially filled as the piston blank is initially rotated. Throughout a first complete revolution of the piston blank the laser beam is focused to a diameter of about 0.076 inch (0.2 cm) and the energy level of the laser is reduced to about 4 KW thereby providing a power density of about 270 KW/in$^2$ (40 KW/cm$^2$) to form in situ a portion of the desired unitary insert ring as well as the desired diffusion zone of alloyed aluminum and steel.

Throughout a second revolution of the piston blank the energy level of the laser beam is increased to 8 KW and the diameter of the spot size to which the laser beam is focused is increased to 0.153 inch (0.38 cm) providing a power density of about 115 KW/in$^2$ (18 KW/cm$^2$). The rate of introduction of the stainless steel powder is such that the groove in the piston blank is filled during the second revolution thereof and the formation of the unitary insert ring in situ is completed.

In both of the above examples, the piston blank has a diameter of about 6 inches (15 cm) and is of conventional configuration. The temperature of the piston ring blank is well below 800° F. (425° C.) upon completion of the process of forming the unitary insert ring in situ.

It is believed that those skilled in the art will make obvious variations in the materials used and in the steps of the process in making pistons in accordance with the teaching of this invention. In particular, it is believed that the particle size of the metal powder, power levels, impingement times and spot sizes used may be adjusted with respect to each other throughout substantial ranges and that more than two passes could be used in forming the unitary insert ring in situ, so long as the power density of the laser beam is high enough to produce extremely rapid melting of all of the metal powder in the groove at the point of impingement to thereby avoid the introduction of an excessive total amount to heat into the piston blank.

What is claimed is:

1. The method of making a piston of aluminum or aluminum alloy with a reinforced piston ring groove comprising the steps of
    a. providing a piston blank with an oversize peripheral piston ring groove of given width formed therein;
    b. mounting said piston blank for rotation about its cylindrical axis;
    c. continuously introducing a powder of a metal harder than said aluminum or aluminum alloy into said oversize groove at a selected point;
    d. rotating said piston blank about said cylindrical axis thereof;
    e. impinging a beam of coherent electromagnetic energy focused to a diameter smaller than said given width of said oversize groove on said metal powder substantially at the point of introduction thereof into said groove, said beam having a power density such that all of said metal powder at the area impinged by said beam is heated to the melting point thereof and subsequently solidifies in said groove after impingement by said beam;
    f. continuing said steps of introducing said metal powder, rotating said piston and impinging said beam until a unitary ring of said melted and subsequently solidified metal powder substantially filling said oversize groove is formed in situ in said groove with a diffusion zone of an alloy of said metal powder with said aluminum or aluminum alloy at the interface between said unitary ring and said piston blank; and g. forming a piston ring groove in said unitary ring.

2. The method of making a piston as claimed in claim 1 wherein the time rate of said step of introducing a powder of metal into said oversize groove and the time rate of said step of rotating said piston blank are related in such a way that a plurality of rotations of said piston blank are required to form said unitary ring of said melted and subsequently solidified metal powder substantially filling said oversize groove.

3. The method of claim 1 wherein said beam of coherent electromagnetic energy impinged on said metal powder in said oversize groove has a power density of at least about 20 KW per square inch.

4. The method of claim 2 wherein two complete rotations of said piston blank are required to form said unitary ring and the power density of said beam of coherent electromagnetic energy is maintained at a first level throughout the first rotation of said piston blank and at a substantially lower level throughout the second rotation of said piston blank.

5. The method of claim 1 including the step of flooding the area of impingement of said beam on said metal powder with an inert gas.

* * * * *